US010402555B2

(12) United States Patent
Shao et al.

(10) Patent No.: US 10,402,555 B2
(45) Date of Patent: Sep. 3, 2019

(54) BROWSER ATTESTATION CHALLENGE AND RESPONSE SYSTEM

(71) Applicant: Google Inc., Mountain View, CA (US)

(72) Inventors: Haidong Shao, Sunnyvale, CA (US); Hongshu Liao, Mountain View, CA (US); Jiexing Gu, San Jose, CA (US); Jason Fedor, Sunnyvale, CA (US); Aaron Malenfant, Redwood City, CA (US); Ying Liu, Sunnyvale, CA (US); Wei Liu, San Jose, CA (US)

(73) Assignee: Google LLC, Mountain View, CA (US)

( * ) Notice: Subject to any disclaimer, the term of this patent is extended or adjusted under 35 U.S.C. 154(b) by 165 days.

(21) Appl. No.: 14/973,063

(22) Filed: Dec. 17, 2015

(65) Prior Publication Data

US 2017/0180373 A1 Jun. 22, 2017

(51) Int. Cl.
*G06F 21/44* (2013.01)
*G06F 21/36* (2013.01)
(Continued)

(52) U.S. Cl.
CPC .............. *G06F 21/36* (2013.01); *G06F 21/40* (2013.01); *G06F 21/44* (2013.01); *G09C 5/00* (2013.01);
(Continued)

(58) Field of Classification Search
None
See application file for complete search history.

(56) References Cited

U.S. PATENT DOCUMENTS 7,236,610 B1 * 6/2007 Luo .................. G06F 21/16
348/E5.006
7,565,543 B1 * 7/2009 Mungale ........... G06F 17/30861
340/5.86

(Continued)

FOREIGN PATENT DOCUMENTS

| CN | 102098305 | 6/2011 |
| WO | WO 2009/050407 | 4/2009 |
| WO | WO 2014/188210 | 11/2014 |

OTHER PUBLICATIONS

BetterAuth: Web Authentication Revisited. Johns et al. ACSAC. (Year: 2012).*

(Continued)

*Primary Examiner* — Venkat Perungavoor
(74) *Attorney, Agent, or Firm* — Dority & Manning, P.A.

(57) ABSTRACT

Systems and methods for screening unauthorized devices are provided. More particularly, a challenge that includes a first set of data can be generated. The challenge can require a browser of a requesting device to perform a browser task with respect to the first set of data to generate a second set of data. The challenge can be provided to the requesting device and a response to the challenge can be received. The response can include the second set of data generated by the browser of the requesting device through performance of the browser task. It can be determined whether the browser of the requesting device is an authorized browser based, at least in part, on the second set of data. Whether or not the requesting device is authorized to access a resource can be based, at least in part, on whether the browser is an authorized browser.

19 Claims, 5 Drawing Sheets

(51) Int. Cl.
*G06F 21/40* (2013.01)
*H04L 9/32* (2006.01)
*H04L 29/06* (2006.01)
*G09C 5/00* (2006.01)
*G06F 21/64* (2013.01)

(52) U.S. Cl.
CPC ........ *H04L 9/3228* (2013.01); *H04L 63/0876* (2013.01); *H04L 63/102* (2013.01); *G06F 2221/2103* (2013.01); *G06F 2221/2133* (2013.01); *H04L 63/168* (2013.01)

(56) References Cited

U.S. PATENT DOCUMENTS

| | | | |
|---|---|---|---|
| 8,176,321 B1* | 5/2012 | Perry | G06F 21/53 713/167 |
| 8,327,441 B2 | 12/2012 | Kumar et al. | |
| 8,381,094 B1* | 2/2013 | Prasad | G06F 17/30861 709/203 |
| 8,392,986 B1 | 3/2013 | Gossweiler, III | |
| 8,949,713 B1* | 2/2015 | Sun | G06F 17/243 715/221 |
| 8,954,583 B1* | 2/2015 | Zhou | H04L 67/42 709/224 |
| 2008/0162227 A1 | 7/2008 | Jakobsson et al. | |
| 2009/0292924 A1 | 11/2009 | Johnson et al. | |
| 2010/0287132 A1* | 11/2010 | Hauser | G06F 17/241 706/52 |
| 2011/0029902 A1 | 2/2011 | Bailey | |
| 2011/0099629 A1* | 4/2011 | Boesgaard | G06F 21/31 726/22 |
| 2012/0090030 A1* | 4/2012 | Rapaport | H04L 63/1441 726/23 |
| 2012/0210119 A1* | 8/2012 | Baxter | G06F 17/30861 713/150 |
| 2013/0212387 A1* | 8/2013 | Oberheide | H04L 63/08 713/168 |
| 2014/0143546 A1 | 5/2014 | McMurtry et al. | |
| 2014/0173709 A1 | 6/2014 | Eldar et al. | |
| 2014/0283067 A1* | 9/2014 | Call | H04L 63/1425 726/23 |
| 2014/0325682 A1 | 10/2014 | Turgeman et al. | |
| 2014/0365644 A1 | 12/2014 | Tanaka et al. | |
| 2015/0128236 A1 | 5/2015 | Moscicki et al. | |
| 2015/0188977 A1 | 7/2015 | Berry et al. | |

OTHER PUBLICATIONS

PCT International Search Report for corresponding PCT Application No. PCT/US2016/057885, dated Jan. 18, 2017, 4 pages.

* cited by examiner

BROWSER ATTESTATION CHALLENGE AND RESPONSE SYSTEM

FIELD

The present disclosure relates generally to online challenge-response schemes and, more particularly, to systems and methods that limit access to online resources by verifying browser authenticity through challenges and responses.

BACKGROUND

Trust is an asset in web-based interactions. For example, a user must trust that an entity provides sufficient mechanisms to confirm and protect her identity or other confidential information in order for the user to feel comfortable interacting with such entity. Further, an entity that provides an online resource must be able to block automated attacks that attempt to gain access to the online resource for malicious purposes. Automated programs, known as "robots" or "bots", can attempt to gain access to a web resource. Thus, sophisticated authentication mechanisms that can discern between a resource request originating from a human being and a request generated by a bot are vital tools in ensuring that online resources are protected from automated attacks and developing the necessary relationship of trust between a resource provider and a user.

SUMMARY

Aspects and advantages of embodiments of the present disclosure will be set forth in part in the following description, or may be learned from the description, or may be learned through practice of the embodiments.

One aspect of the present disclosure is directed to a computer-implemented method to screen for unauthorized devices. The method includes receiving, by one or more computing devices, a request from a requesting device to access a resource, The method further includes generating, by one or more computing devices, a challenge for the requesting device. The challenge can include a first set of data, and the challenge can require a browser of the requesting device to perform a browser task with respect to the first set of data to generate a second set of data. The method also includes providing, by the one or more computing devices, the challenge to the requesting device. The method includes receiving, by the one or more computing devices, a response to the challenge from the requesting device. The response can include the second set of data generated by the browser of the requesting device through performance of the browser task with respect to the first set of data. The method also includes determining, by the one or more computing devices, whether the browser of the requesting device is an authorized browser based at least in part on the second set of data. The method includes determining, by the one or more computing devices, whether the requesting device is authorized to access the resource based at least in part on whether the browser of the requesting device is an authorized browser.

Another aspect of the present disclosure is directed to a computing system for screening unauthorized devices. The system includes one or more processors and one or more memory devices. The one or more memory devices can store computer-readable instructions that when executed by the one or more processors cause the one or more processors to perform operations. The operations include receiving a request from a requesting device to access a resource. The operations further include generating a challenge for the requesting device. The challenge can include a first set of data, and the challenge can require the requesting device to perform a verification task with respect to the first set of data to generate a second set of data. The operations also include providing the challenge to the requesting device and receiving a response to the challenge from the requesting device. The response can include the second set of data generated by the requesting device through performance of the verification task with respect to the first set of data. The operations include determining whether a request to access the resource was sent by a browser of the requesting device based at least in part on the second set of data.

Yet another aspect of the present disclosure is directed to one or more tangible, non-transitory computer-readable media storing computer-readable instructions that when executed by one or more processors cause the one or more processors to perform operations. The operations include receiving a request from a requesting device to access a resource. The operations further include generating a challenge for the requesting device. The challenge can require a browser of the requesting device to perform a browser task without human input to generate a set of browser data based at least in part on a browser-type associated with the browser. The operations include providing the challenge to the requesting device and receiving a response to the challenge from the requesting device. The response can include the set of browser data generated by the browser of the requesting device through performance of the browser task without human input. The operations also include determining whether the browser-type associated with the browser is an authorized browser-type based at least in part on the set of browser data. The operations include determining whether the requesting device is authorized to access the resource based at least in part on whether the browser-type associated with the browser is an authorized browser-type.

Other example aspects of the present disclosure are directed to systems, apparatus, tangible, non-transitory computer-readable media, user interfaces, memory devices, and electronic devices for screening for unauthorized devices using browser-based verification challenges.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to limiting access to online resources by verifying browser authenticity. For instance, a computing device (hereinafter, "requesting device") can request access to an online resource. Bots typically do not request access to online resources through authentic browsers. To verify whether the request is coming from such a browser, a verification system can provide a verification challenge to the requesting device. In particular, the challenge can include one or more instructions prompting the requesting device to perform a browser task. The requesting device can perform the browser task to generate a response to the challenge and then provide the response to the verification system. The verification system can determine whether the browser of the requesting device is an authorized browser (e.g., one not typically associated with bots) based on the response. In the event that the browser is an authorized browser, the requesting device can be permitted to access the requested online resource.

More particularly, a requesting device can attempt to access an online resource through a computing device. As used herein, a requesting device can be a laptop computer, desktop computer, smartphone, tablet, wearable computing device, server, or any other suitable computing device. A requesting device can have a user associated therewith. However, in the event a bot is utilized, a user may not be associated with the requesting device.

In order to access the online resource, the requesting device can first be required to interact with a computerized verification system to attest the browser of the requesting device, thereby preventing bots from damaging the online resource. For instance, the verification system can provide a challenge to the requesting device, and the requesting device can gain access to the online resource if the requesting device "passes" the challenge. In some implementations, the challenge can require the requesting device to perform a browser task that causes the requesting device to generate a response that can be used to determine if the browser is authorized to access the online resource.

For instance, the challenge can include a first set of data and can require a browser of the requesting device to perform a browser task with respect to the first set of data to generate a second set of data. In some example implementations, the browser task can include executing a set of JavaScript instructions that can cause the requesting device to generate an indication of a Document Object Model (DOM) of the browser of the requesting device. As another example, the browser task can cause a browser of the requesting device to render a Scalable Vector Graphics (SVG) image. As yet another example, the challenge can include a hash function and the browser task can include application of the hash function to various data, as will be discussed further below.

In some implementations, the challenge-response protocols can be essentially invisible such that it is not readily visible by a user, and is thus minimally intrusive from the standpoint of the user. Moreover, the browser task required by the challenge can be performed without human input. The challenge can be provided to the requesting device attempting to gain access to the online resource.

The requesting device can generate one or more responses to the challenge. A response can include a second set of data generated by the browser of the requesting device through the performance of the browser task. For instance, if the browser task includes executing a set of JavaScript instructions requiring the generation of an indication of a Document Object Model (DOM), the second set of data can provide the indication of the Document Object Model (DOM) of the browser of the requesting device. As another example, if the browser task includes rendering a Scalable Vector Graphics (SVG) image, the second set of data can include the rendered image. As yet another example, the browser task can include applying a hash function to various data, including, for example, the indication of the DOM of the browser, the SVG image, or other items generated in response to portions of the challenge other than the hash function. Thus, in some implementations, the challenge can include a first stage and a second stage, where the first stage requires the requesting device to perform a first browser task to generate an intermediate answer (e.g., an indication of the DOM of the browser) and a second stage requires the requesting device to apply a hash function to the intermediate answer to provide a hashed answer (e.g., a hash of an indication of the DOM of the browser). In such implementations, the second set of data, included in the response, can include one or more hashed answers. After generation of the response, the requesting device can provide the response to the verification system.

The verification system can receive the response from the requesting device and determine whether the browser of the requesting device is an authorized browser. For instance, the verification system can compare the second set of data (included in the response) to target data. The target data can, for example, include one or more previous responses associated with one or more authorized browser-types.

Based at least in part on the comparison of the second set of data to the target data, the verification system can determine if the browser of the requesting device is an authorized browser. As an example, the verification system can identify a browser-type associated with the browser of the requesting device based at least in part on the comparison of the second set of data to the target data. The verification system can determine whether the browser-type associated with the browser is an authorized browser-type. For instance, certain browser-types that are not generally utilized by bots can be considered authorized browser-types. The verification system can determine that the browser is not an authorized browser if the browser-type associated with the browser of the requesting device is not an authorized browser-type. However, in the event that the browser-type associated with the browser of the requesting device is an authorized browser-type, the verification system can determine that the browser is an authorized browser.

The verification system can determine whether the requesting device is authorized to access the online resource based, at least in part, on whether the browser of the requesting device is an authorized browser. For example, if the browser is an authorized browser, the verification system can grant the requesting device access to the online resource. However, in the event that the verification system determines that the browser is not an authorized browser, the verification system can deny the requesting device access to the online resource. Moreover, in the event that the verification system determines that the request is not associated with a browser and/or that no browser is associated with the requesting device, the verification system can deny the requesting device access to the online resource. Additionally, and/or alternatively, the verification system can generate and provide another challenge to the requesting device that was denied access to the online resource.

According to another aspect of the present disclosure, the verification system can generate a challenge that includes a plurality of portions. Each portion can include one or more seeds, where each seed represents or otherwise includes a different browser task to be performed and/or the respective data upon which the task should be performed. Thus, in some implementations of the present disclosure, the verification system can generate challenges that require multiple browser tasks to be performed. The multiple browser tasks can be independent or dependent (e.g., sequential).

In some implementations, the seeds may also be of different types. As one example, the one or more seeds can include one or more static seeds that can, for instance, remain constant among the challenges. For example, every challenge provided by the verification system will include the one or more static seeds, while other seeds may change or rotate (e.g., randomly) among different challenges provided over time. As another example, the one or more seeds can include one or more known seeds with known responses. The seeds can also include one or more seeds for crowdsourcing and/or seeds to generate noise. Thus, at least some of the seeds may be used for crowdsourced data collection rather than verification of the requesting device. After sufficient crowdsourced data has been collected, the crowdsourcing seeds can be changed into seeds which are used for preforming requesting device authentication.

Thus, the present disclosure provides systems and methods for limiting access to online resources by verifying browser authenticity. In such fashion, the risk of exposing online resources to bots can be reduced through less obstructive challenge-response protocols. For example, an online consumer review service that receives a request to access an online product rating tool can utilize the verification system to protect the integrity of the product rating. The verification system can attest the browser of a requesting device through invisible challenges including browser tasks that do not require human input, thereby reducing potential bot exposure while allowing human users to access the online rating tool with less interruption.

Figure 1:
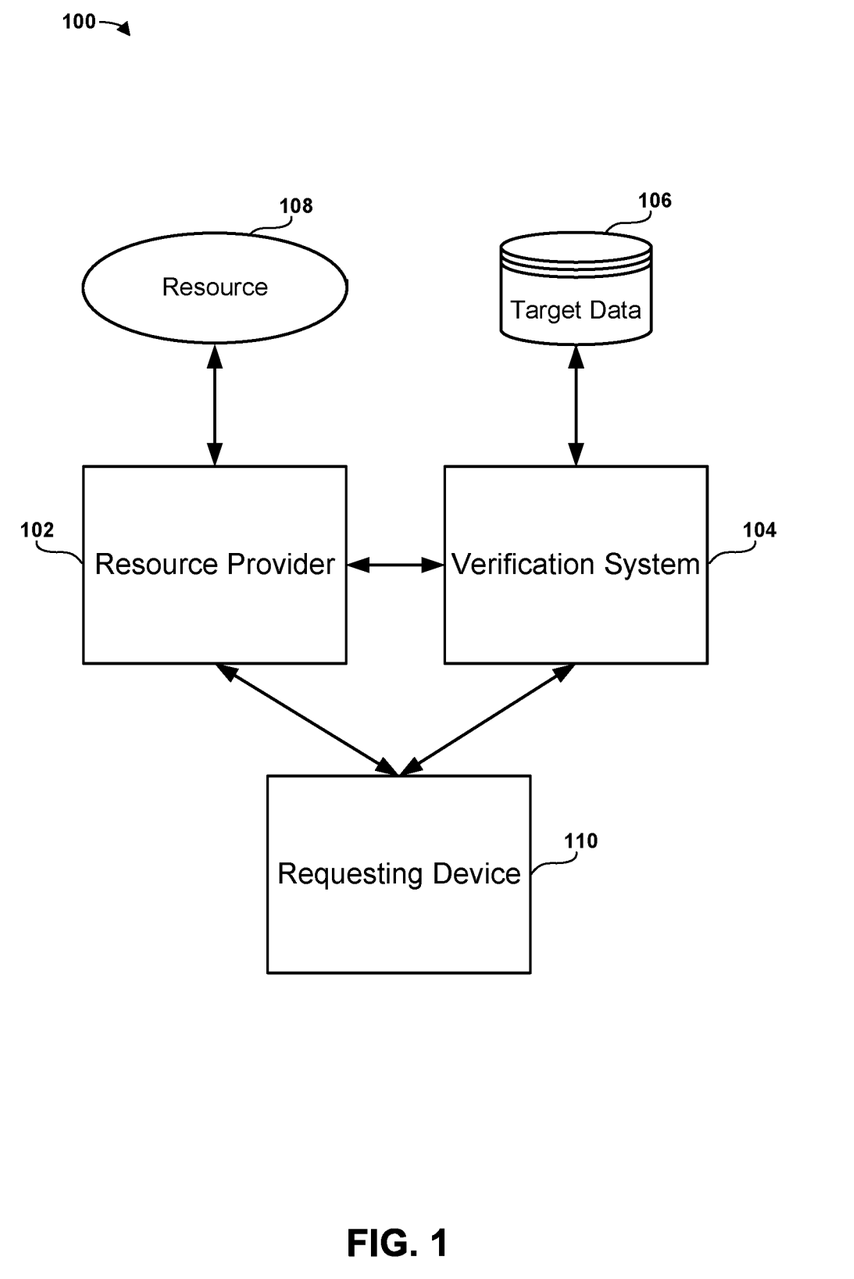
FIG. 1 depicts an overview of an example system for providing challenges according to example embodiments of the present disclosure.

With reference now to the Figures, example aspects of the present disclosure will be discussed in more detail. For instance, FIG. 1 depicts an overview of an example system 100 for providing challenges. In particular, system 100 can include a resource provider 102, a computerized verification system 104, a target database 106, a resource 108, and a requesting device 110. In some implementations, resource provider 102 and verification system 104 can communicate with each other over a network.

Resource provider 102 can be associated with an online or other resource 108. By way of example, resource provider 102 can be associated with a consumer rating service with one or more consumer rating tools. However, the resource provider 102 can provide access to any number of different types of resources 108, including any data, tools, services, information, files, or other forms of resources for which verification prior to access is desired. The resources 108 (and/or the data associated therewith) can, for example, be stored in a database associated with resource provider 102.

Resource provider 102 can receive a request from requesting device 110 for access to the online resource 108 (e.g., consumer rating tool). In response to the request, resource provider 102 can coordinate with verification system 104 to provide a verification challenge to requesting device 110.

Verification system 104 can be implemented using one or more computing devices, such as, for example, one or more servers. Verification system 104 can be configured to generate verification challenges and to provide such challenges to requesting device 110 in response to, for example, a request from requesting device 110. In some implementations, the challenges can be browser task based challenges. For instance, a challenge can include a first set of data and can require a browser of requesting device 110 to perform a browser task with respect to the first set of data. The browser task can include a set of instructions that can, upon execution, cause requesting device 110 to generate a second set of data.

For instance, as indicated above, the challenge can include a hash function and the browser task can include application of the hash function to various data. Additionally, and/or alternatively, the browser task can include a set of JavaScript instructions that can cause, upon execution, requesting device 110 to generate an indication of a Document Object Model (DOM) of the browser of requesting device 110. As another example, the browser task can require a browser of requesting device 110 to render a Scalable Vector Graphics (SVG) image.

In some implementations, the challenge-response protocols can be essentially invisible. For instance, verification system 104 can be configured to generate an invisible challenge, such that the challenge is not readily visible by a user. In some instances, the browser task (and/or its instructions) can be viewed in the html language associated with the browser; however, a user associated with requesting device 110 cannot readily view the browser task without such inspection. Additionally, and/or alternatively, the browser task required by the challenge can be performed without human input. For instance, the browser task can include applying a hash function to various data, for example, an indication of a DOM of the browser, an SVG image, or other items generated in response to the challenge. Requesting device 110 and/or the browser can perform the browser task (e.g., apply the hash function) to generate a response without input from a user of requesting device 110. In this manner, requesting device 110 can generate a response to a challenge with less user interruption.

Verification system 104 can be configured to provide a challenge to requesting device 110. In some implementations, verification system 104 can be configured to directly provide the challenge to requesting device 110. In some implementations, verification system 104 can be configured to indirectly provide the challenge to requesting device 110 via resource provider 102. For example, the resource provider 102 can utilize an application programming interface (API) to request and receive a challenge from the verification system 104 and then provide the received challenge to requesting device 110.

Verification system 104 can be configured to receive a response to the challenge. For instance, verification system 104 can be configured to directly receive a response to the challenge from requesting device 110. In other implementations, the verification system 104 indirectly receives a response from requesting device 110 via resource provider 102. For example, the resource provider 102 can utilize the API to provide the received response to the verification system 104 and then receive an indication of the validity of the response from the verification system 104.

The response can include a second set of data generated by the browser of requesting device 110 through the performance of the browser task. For instance, the second set of data can provide the indication of the Document Object Model (DOM) of the browser of requesting device 110, a rendered Scalable Vector Graphics (SVG) image, and/or one or more hashed answers, as further described herein.

As shown, verification system 104 can be configured to access target data from a target database 106. In example implementations, target database 106 can be a single database located in a single location, or can include multiple databases spread across multiple locations. As verification system 104 generates challenges and receives responses, it may store the challenge-response pair in the target database 106. The target data can include, for example, one or more previously received responses to one or more challenges and the data associated therewith. Additionally, and/or alternatively, the target data can include one or more known responses to one or more challenges and the data associated with the one or more known responses.

By way of example, target data can include previously received and/or known indications of browser DOM, SVG images, hash values, and/or other portions of a response for each verification challenge. The responses included in the target data can include metadata, a pointer, a link, and/or some other type of identifier by which verification system 104 can identify which responses are associated with a particular challenge. The responses can be collected and stored in target database 106 by verification system 104 using crowdsourcing techniques. Additionally, and/or alternatively, verification system 104 can cluster the responses to effectively group them. Thus, in some implementations, crowdsourced answers can be clustered to identify a "correct" answer indicated by the crowdsourced data.

Moreover, the responses stored in the target data can be associated with a browser-type. The browser-type can be associated with the browser of requesting device 110 that provided the stored response. The known responses can be associated with one or more browser-types of one or more browsers that are known to generate a known response to a given challenge. The responses and/or associated browser-types can include metadata, a pointer, a link, and/or some other type of identifier by which verification system 104 can identify the browser-type associated with a response. Certain browser-types can be considered authorized browser-types. For instance, browser-types that are not generally utilized by bots can be considered authorized browser-types.

Verification system 104 can be configured to determine whether a browser exists on requesting device 110. For instance, verification system 104 can be configured to determine whether the request to access resource 108 was sent by a browser of requesting device 110 based, at least in part, on examination of the second set of data. If requesting device 110 is unable to perform the browser task and/or generates a second set of data that does not indicate a browser exists, verification system 104 can determine that the request for resource 108 was not sent by a browser of requesting device 110. In such a case, verification system 104 can deny requesting device 110 access to resource 108. If requesting device 110 is able to perform the browser task and/or generate a second set of data that indicates a browser may exist, verification system 104 can determine whether the browser is an authorized browser.

In addition, if the response indicates that that requesting device has a browser, the verification system 104 can be configured to further determine whether the browser of requesting device 110 is an authorized browser based, at least in part, on the response. For instance, verification system 104 can be configured to receive a response to a challenge from requesting device 110. The response can include the second set of data generated by the browser of requesting device 110 through performance of the browser task. Verification system 104 can be configured to compare the second set of data (included in the response) to the target data to determine whether an authorized browser exists.

For example, if the browser task of a challenge includes rendering a Scalable Vector Graphics (SVG) image, the second set of data generated by the browser of requesting device 110 through performance of the browser task can include least a portion of the rendered image or a hash of at least the portion of the rendered image. The target data of target database 106 may include one or more previously received rendered images that were received by verification system 104 in response to a same or similar challenge. Each of the one or more previously received rendered images can be associated with a browser-type that identifies the type of browser of requesting device 110 that provided the one or more previously received images. Verification system 104 can, for instance, compare the rendered image included in the second set of data to the one or more previously received rendered images of the target data to determine which browser-type is associated with the browser of requesting device 110 currently requesting access to resource 108.

If the browser-type associated with the browser of requesting device 110 is not an authorized browser-type, verification system 104 can be configured to determine that the browser is not an authorized browser. If, however, the browser-type associated with the browser of requesting device 110 is an authorized browser-type, verification system 104 can be configured to determine that the browser is an authorized browser. Verification system 104 can be configured to authorize requesting device 110 to access requested resource 108, for instance, if it is determined that the browser of requesting device 110 browser is an authorized browser.

Figure 2:
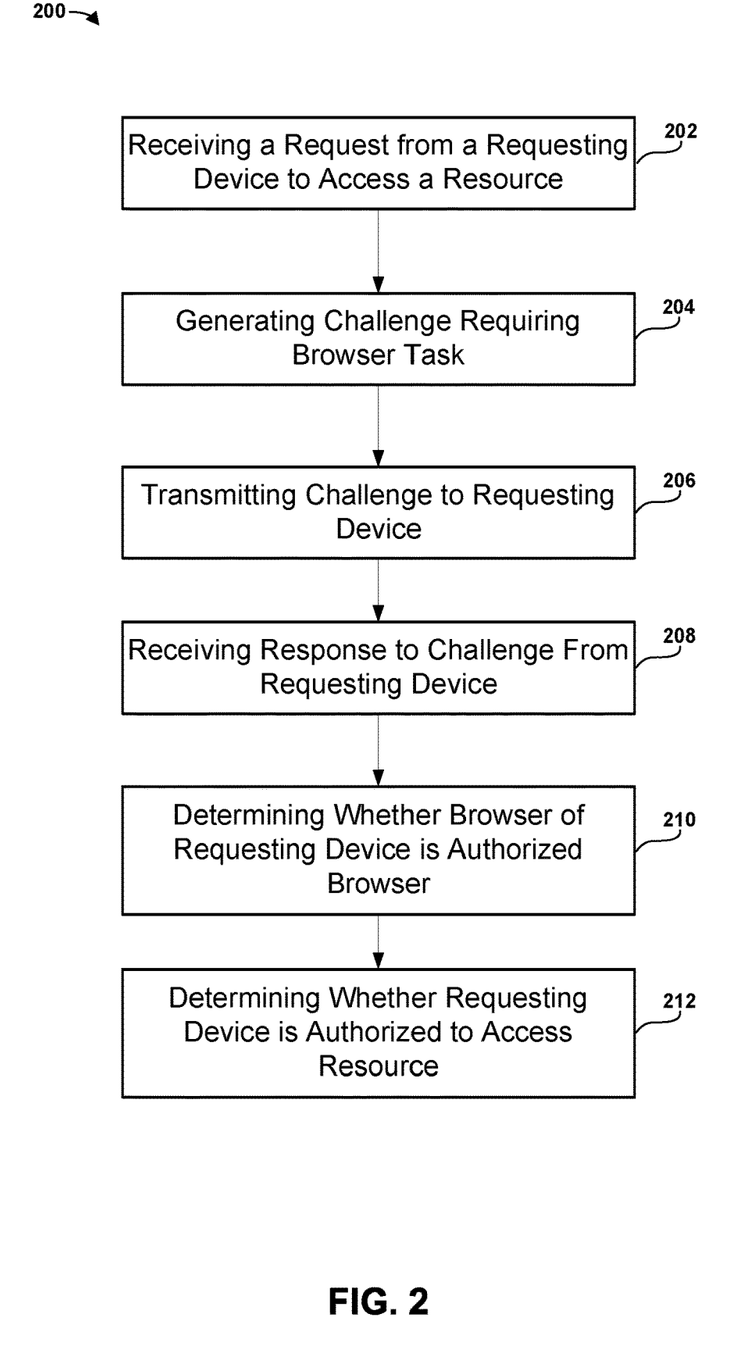
FIG. 2 depicts a flow diagram of an example method to screen for unauthorized devices according to example embodiments of the present disclosure.

FIG. 2 depicts a flow diagram of an example method (200) to screen for unauthorized devices according to example embodiments of the present disclosure. Method (200) can be implemented by one or more computing devices, such as one or more of the computing devices depicted in FIG. 5. In addition, FIG. 2 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (202), method (200) can include receiving a receiving a request from requesting device 110 to access resource 108. For instance, verification system 104 can receive a request from requesting device to access resource 108. In some implementations, verification system 104 can receive a request to engage in a verification process to access resource 108. As such, the request to engage in the verification process can be the request to access resource 108.

At (204), method (200) can include generating a challenge requiring a browser task. For instance, verification system 104 can generate a challenge for requesting device 110 that has requested access to resource 108. The challenge can allow verification system 104 to determine whether or not requesting device 110 should be authorized to access requested resource 108.

The challenge can include a first set of data and the challenge can require a browser of requesting device 110 to perform a browser task with respect to the first set of data to generate a second set of data. The first set of data can include, for instance, JavaScript instructions and the browser task can include execution of the JavaScript instructions. By way of example, the browser task can require requesting device 110 (and/or the browser of requesting device 110) to generate an indication of a Document Object Model (DOM) of the browser. In another example, the browser task can require requesting device 110 (and/or the browser of requesting device 110) to render a Scalable Vector Graphics (SVG) image. As yet another example, the first set of data can include a hash function and the browser task can include application of the hash function to various data. For instance, the hash function can be applied to the indication of the DOM of the browser, the SVG image, or other items generated in response to portions of the challenge other than the hash function.

Additionally, and/or alternatively, the challenge can include a first stage and a second stage. The first stage can, for instance, require requesting device 110 to perform a first browser task to generate an intermediate answer. The intermediate answer can include, for example, an indication of the DOM of the browser and/or least a portion of the rendered SVG image. The second stage can require requesting device 110 to apply a hash function to the intermediate answer to provide a hashed answer.

At (206), method (200) can include transmitting the challenge to requesting device 110. For instance, verification system 104 can provide the challenge to requesting device 110. In some implementations, verification system 104 can directly provide the challenge to requesting device 110. Additionally, and/or alternatively, verification system 104 can provide the challenge to resource provider 102 and resource provider 102 can provide the challenge to requesting device 110.

At (208), method (200) can include receiving a response to the challenge from requesting device 110. For instance, verification system 104 can receive a response to the challenge from requesting device 110. The response can include a second set of data generated by the browser of requesting device 110 through performance of the browser task with respect to the first set of data. For example, if the browser task includes execution of a set of JavaScript instructions to generate an indication of a Document Object Model (DOM) of the browser of requesting device 110, the second set of data can provide at least an indication of a Document Object Model (DOM) of the browser of requesting device 110. In another example, if the browser task includes rendering of a Scalable Vector Graphics (SVG) image, the second data set can include at least a portion of the rendered image. In yet another example, if the browser task includes performing a hash function, and the second set of data can include a hash value.

Additionally, and/or alternatively, if the challenge includes first and second stages and the second stage includes applying the hash function to an intermediate answer (generated in response to the first stage), the second set of data can include a hashed answer. The hashed answer can include, for example, a hash of the indication of the Document Object Model (DOM) or a hash of at least the portion of the rendered image.

At (210), method (200) can include determining whether the browser of requesting device 110 is an authorized browser. Bots may request access to online resources without the use of a browser. Accordingly, verification system 104 can determine whether the request to access resource 108 was sent by a browser at all and/or whether a browser even exists on requesting device 110.

For instance, verification system 104 can process the response received from requesting device 110 to determine, for example, whether a browser exists on requesting device 110 and/or whether a browser generated the response (and/or the second set of data) through performance of a verification task. In this way, verification system 104 can determine whether a request to access resource 108 was sent by a browser of requesting device 110 based at least in part on the response (and/or the second set of data).

If no browser exists and/or the request for resource 108 was not sent from a browser, verification system 104 can deny authorization of requesting device 110 to requested resource 108. If, however, verification system 104 determines that a browser exists and/or sent the request to access resource 108, verification system 104 can determine if the browser is an authorized browser.

For instance, verification system 104 can determine whether the browser of requesting device 110 is an authorized browser based, at least in part, on the second set of data included in the response received from the requested device. In some implementations, verification system 104 can compare the second set of data to target data that includes one or more browser-type, as described above. The verification system can identify a browser-type associated with the browser based, at least in part, on the comparison of the second set of data to the target data. Additionally, and/or alternatively, the verification system can determine whether the browser-type associated with the browser is an authorized browser-type.

For example, the second set of data can include a rendered Scalable Vector Graphics (SVG) image and verification system 104 can determine whether the browser of requesting device 110 is an authorized browser by comparing the rendered image to one or more target images. The target images can include previously rendered images that were received from browsers associated with authorized browser-types (e.g., ones not typically associated with bots). If the rendered image matches or is similar to one or more of the target images, verification system 104 can determine that the browser-type of the browser is the same as, or at least similar to, the authorized browser-type associated with the target image. In such a case, verification system 104 can determine that the browser of requesting device 110 is an authorized browser. However, if the rendered image (included in the second set of data of the response) does not match or is dissimilar to one or more target images, verification system 104 can determine that the browser-type of the browser is not an authorized browser-type, and thus, is not an authorized browser.

At (212), method (200) can include determining whether requesting device 110 is authorized to access resource 108. For instance, verification system 104 can determine whether requesting device 110 is authorized to access resource 108 based at least in part on whether the browser of requesting device 110 is an authorized browser. For example if verification system 104 determines that the browser is an authorized browser, verification system 104 may authorize requesting device 110 to access resource 108 (e.g., an online rating tool). If, however, verification system 104 determines that requesting device 110 did not request access to resource 108 via a browser or that the browser is not an authorized browser, verification system 104 can deny requesting device 110 access to requested resource 108.

Figure 3:
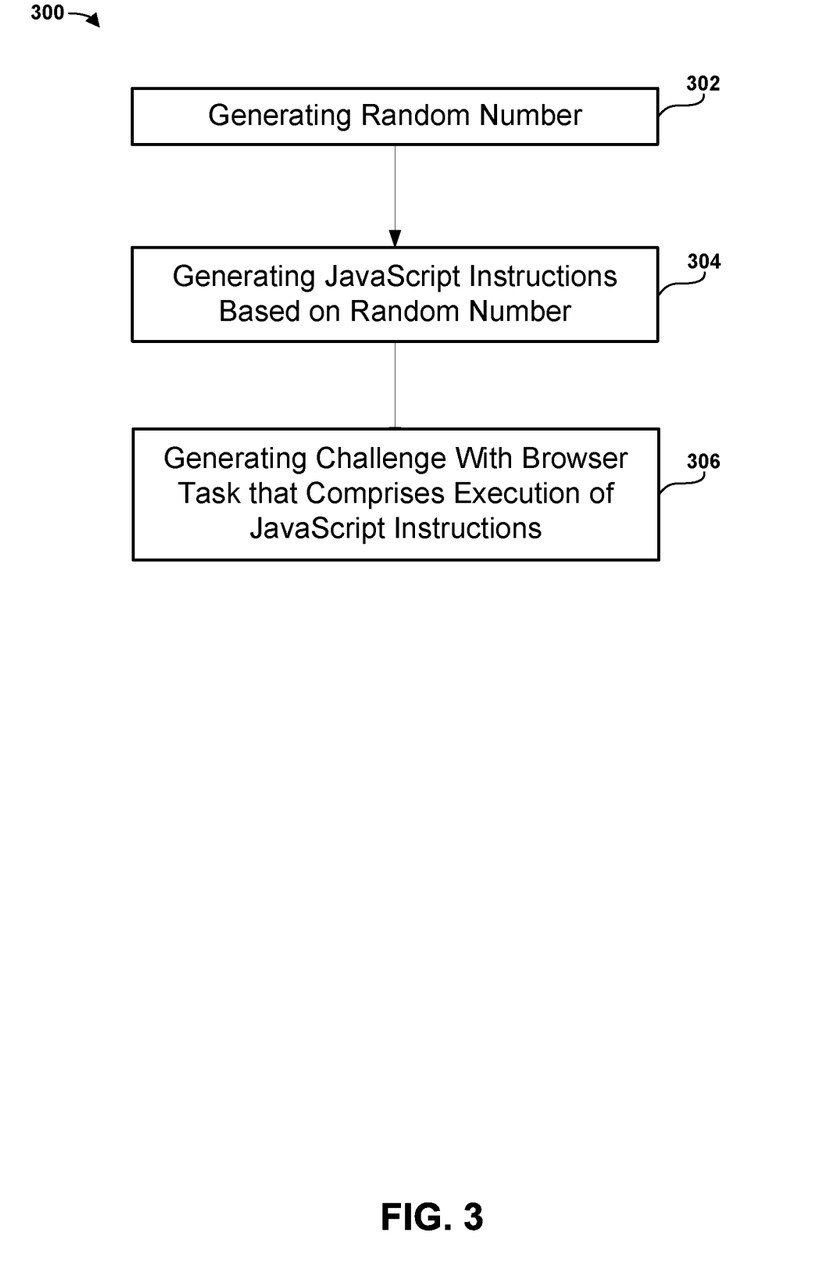
FIG. 3 depicts a flow diagram of an example method to generate a challenge according to example embodiments of the present disclosure.

FIG. 3 depicts a flow diagram of an example method to generate a challenge according to example embodiments of the present disclosure. Method (300) can be implemented by one or more computing devices, such as one or more of the computing devices depicted in FIG. 5. In addition, FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), method (300) can include generating a random number. For instance, verification system 104 can use a random number generator to generate a random number.

At (304), method 304 can include generating a set of JavaScript instructions based on the random number. For instance, each random number can be associated with a set of JavaScript instructions. In one example, the JavaScript instructions can include instructions that when executed cause a browser to generate an indication of a Document Object Model (DOM) of the browser. In another example, the JavaScript instructions can include instructions that when executed cause a browser to render a Scalable Vector Graphics (SVG) image.

At (306), method (300) can include generating a challenge with a browser task that includes execution of the JavaScript instructions. For instance, verification system 104 can generate a challenge that includes a first set of data and requires requesting device 110 to perform the browser task with respect to the first set of data. The first set of data can include the JavaScript instructions, and the browser task can include execution of the JavaScript instructions.

Additionally and/or alternatively, verification system 104 can generate a challenge that includes a plurality of portions. Each portion can include one or more seeds, where each seed represents or otherwise includes a different browser task to be performed and the data upon which the task should be performed. Thus, in some implementations of the present disclosure, the verification system 104 can generate challenges that require multiple browser tasks to be performed. The multiple browser tasks can be independent or dependent (e.g., sequential).

The seeds may also be of different types. As one example, the one or more seeds can include one or more static seeds that can, for instance, remain constant among the challenges. For example, every challenge provided by the verification system will include the static seeds, while other seeds may change or rotate among different challenges provided over time. As another example, the one or more seeds can include one or more known seeds with known responses. The seeds can also, and/or alternatively, include one or more seeds for crowdsourcing and/or seeds to generate noise. Thus, at least some of the seeds may be used for crowdsourced data collection rather than verification of requesting device 110. After sufficient crowdsourced data has been collected, the crowdsourcing seeds can be changed into seeds which are used for requesting device authentication.

In some implementations, a challenge can include a hash function and the browser task can include the application of the hash function to various data. For example, the browser task can include applying the hash function to the indication of the DOM of the browser, the SVG image, or other items generated in response to portions of the challenge other than the hash function.

In some implementations, the challenge can include a plurality of stages. For instance, the challenge can include a first stage and a second stage. The first stage can require requesting device 110 to perform a first browser task to generate an intermediate answer (e.g., an indication of the DOM of the browser, at least a portion of a rendered SVG image). The intermediate answer can be generated through execution of a set of JavaScript instructions. The second stage can require requesting device 110 to apply a hash function to the intermediate answer to provide one or more hashed answers. The hashed answers can include, for example, a hash of the indication of the Document Object Model (DOM) of the browser of requesting device 110 and/or a hash of at least a portion of a rendered image. In such implementations, the response to the challenge can include the one or more hashed answers.

Figure 4:
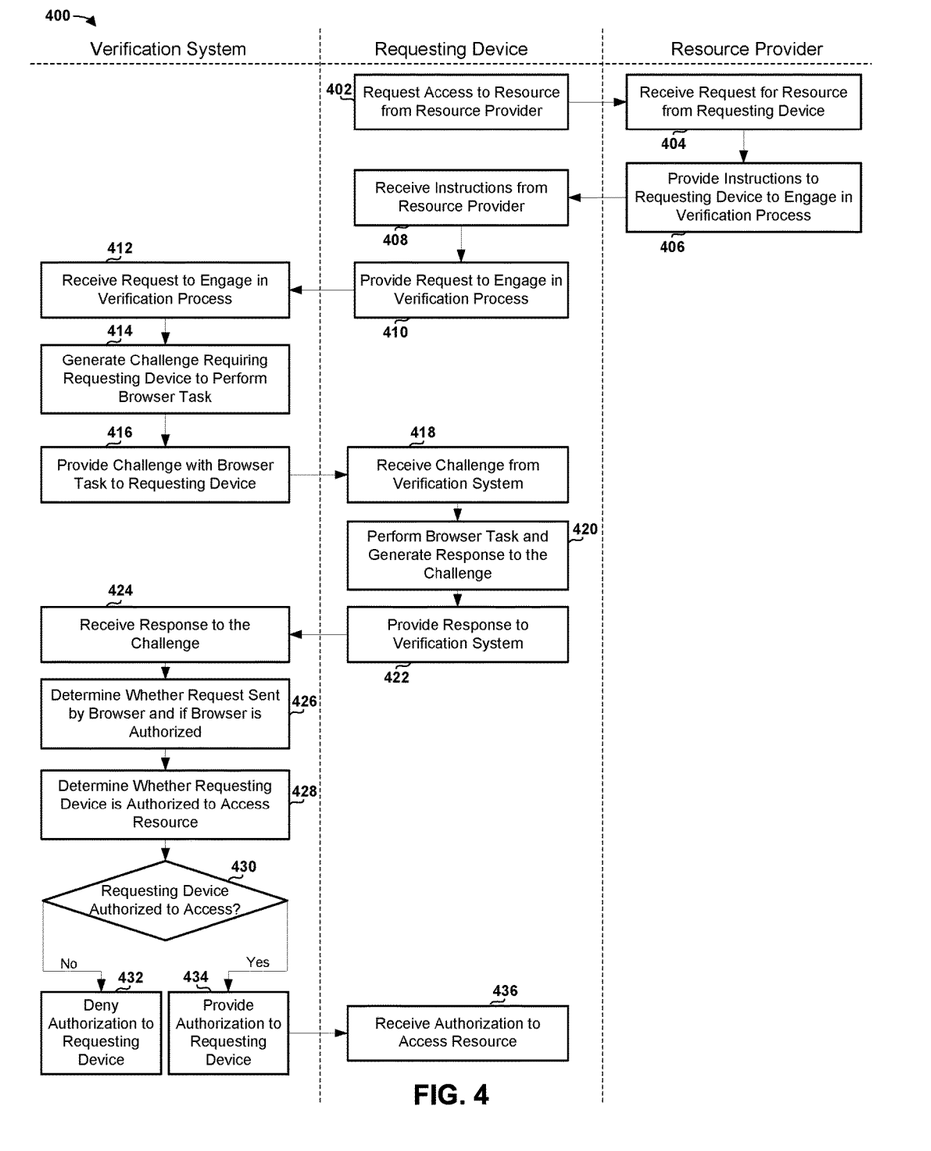
FIG. 4 depicts a flow diagram of an example method to screen for unauthorized devices according to example embodiments of the present disclosure.

FIG. 4 depicts a flow chart of an example method (400) for verifying a requesting device according to an example embodiment of the present disclosure. Method (400) can be implemented by one or more computing devices, such as one or more of the computing devices depicted in FIG. 5. In addition, FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (402) a requesting device can request a resource or access to an online resource from a resource provider. At (404) the resource provider can receive the request from the requesting device.

At (406) resource provider can instruct the requesting device to engage in a verification process. At (408) the requesting device can receive the instructions from the resource provider to directly engage with the verification system. As an example, the resource provider can instruct the requesting device at (406) by redirecting the requesting device so that it directly connects with the verification system and begins the verification process.

As another example, at (406) the resource provider can provide the requesting device with a client-side script that, when executed by the requesting device, causes the requesting device to directly engage with the verification system. For example, the client-side script can be included in an inline frame, embedded object, portlet, or other embedded application or widget. In some implementations, the client-side script can be included in a plug-in provided from the verification system to the resource provider. Furthermore, in some implementations, at (406) the resource provider can provide the requesting device with a public key identifying the resource provider to the verification system.

At (410) the requesting device can transmit a request directly to the verification system to engage in a verification process. At (412) the verification system can receive the request from the requesting device.

As an example, the request transmitted at (410) can be formatted according to an application programming interface associated with the verification system. For example, the request can be transmitted as a result of executing a client-side script provided to the requesting device at (406). Furthermore, in some implementations, the request transmitted at (410) can include a public key associated with the resource provider.

At (414) the verification system can generate a challenge requiring the requesting device to perform a browser verification task. As indicated above, the browser task can include, rendering a Scalable Vector Graphics (SVG) image. As another example, the browser task can include performing a hash function and/or applying a hash function to various data.

At (416) the verification system can provide the challenge, including the browser task, to the requesting device. At (418) the requesting device can receive the challenge from the verification system.

At (420) the requesting device (and/or the browser of the requesting device) can perform the browser task and generate a response to the challenge. The requesting device (and/or the browser of the requesting device) can perform the browser task without human input. The response can also be essentially invisible, as similarly indicated above. The response can include a second set of data generated by the browser of the requesting device through performance of the browser task. For example, the requesting device can generate a second set of data that includes at least a portion of the rendered image through the performance of a browser task that includes rendering a Scalable Vector Graphics (SVG) image. The Scalable Vector Graphics (SVG) image can include any shape. In another example, the requesting device can generate a second set of data that includes an indication of a Document Object Model (DOM) of the browser of the requesting device through the performance of a browser task that includes executing JavaScript instructions to generate an indication of a Document Object Model (DOM).

Additionally, and/or alternatively, the requesting device can generate a second set of data that includes a hash value through the performance of a browser task that includes performing a hash function. In some implementations, the requesting device can generate a response that includes a hashed answer that is created by applying a hash function to various data. The response can include, for example, a hash of an indication of the Document Object Model (DOM) of the browser of the requesting device and/or a hash of at least a portion of a rendered image.

At (422) the requesting device can provide the response to the challenge to the verification system. At (424) the verification system can receive the response from the requesting device.

At (426) the verification system can determine whether the request was sent by a browser and, if so, whether the browser is an authorized browser. For instance, the verification system can determine that the request was sent by a browser based, at least in part, on the second set of data generated through performance of the browser task. As indicated above, the verification system can determine whether the browser of the requesting device is an authorized browser based at least in part on the second set of data. For instance, the verification system can compare the second set of data to target data to determine whether the browser is an authorized browser, as indicated above.

At (428) the verification system can determine whether the requesting device is authorized to access the requested online resource. For instance, if the verification system determines that the browser of the requesting device is an authorized browser (e.g., one not typically associated with bots), the verification system can determine that the requesting device should be authorized to access the resource. If, however, the verification system determines that the browser of the requesting device is not an authorized browser or that the request was not sent from a browser, then the verification system can determine that the requesting device should be denied access to the resource.

At (430), if the verification system determines that the requesting device is not authorized to access the requested resource; then at (432) the verification system can deny the requesting device authorization to access the resource. The verification system can generate and provide another challenge to a requesting device that was denied access to the online resource.

If the verification system determines that the requesting device is authorized to access the requested resource, then at (434) the verification system can provide the requesting device authorization to access the resource. At (436) the requesting device can receive authorization to access the requested resource. The requesting device, the resource provider, and/or the verification system can communicate to allow the requesting device to access the online resource. This can be accomplished by using, for instance, a verification token provided by the verification system.

Method (400) illustrates one non-limiting example implementation by which a requesting device, resource provider, and/or verification system can initiate a verification process. In other implementations, the resource provider can communicate with the verification system and the verification system can provide the challenge to the resource provider. For example, the resource provider can interact with the verification system using an API. The resource provider can provide the challenge directly to the requesting device. Additionally, and/or alternatively, the resource provider can receive the response from the requesting device and/or the verification system can communicate with the resource provider to allow the resource provider to determine whether the browser of the requesting device should be authorized to access the requested resource.

Figure 5:
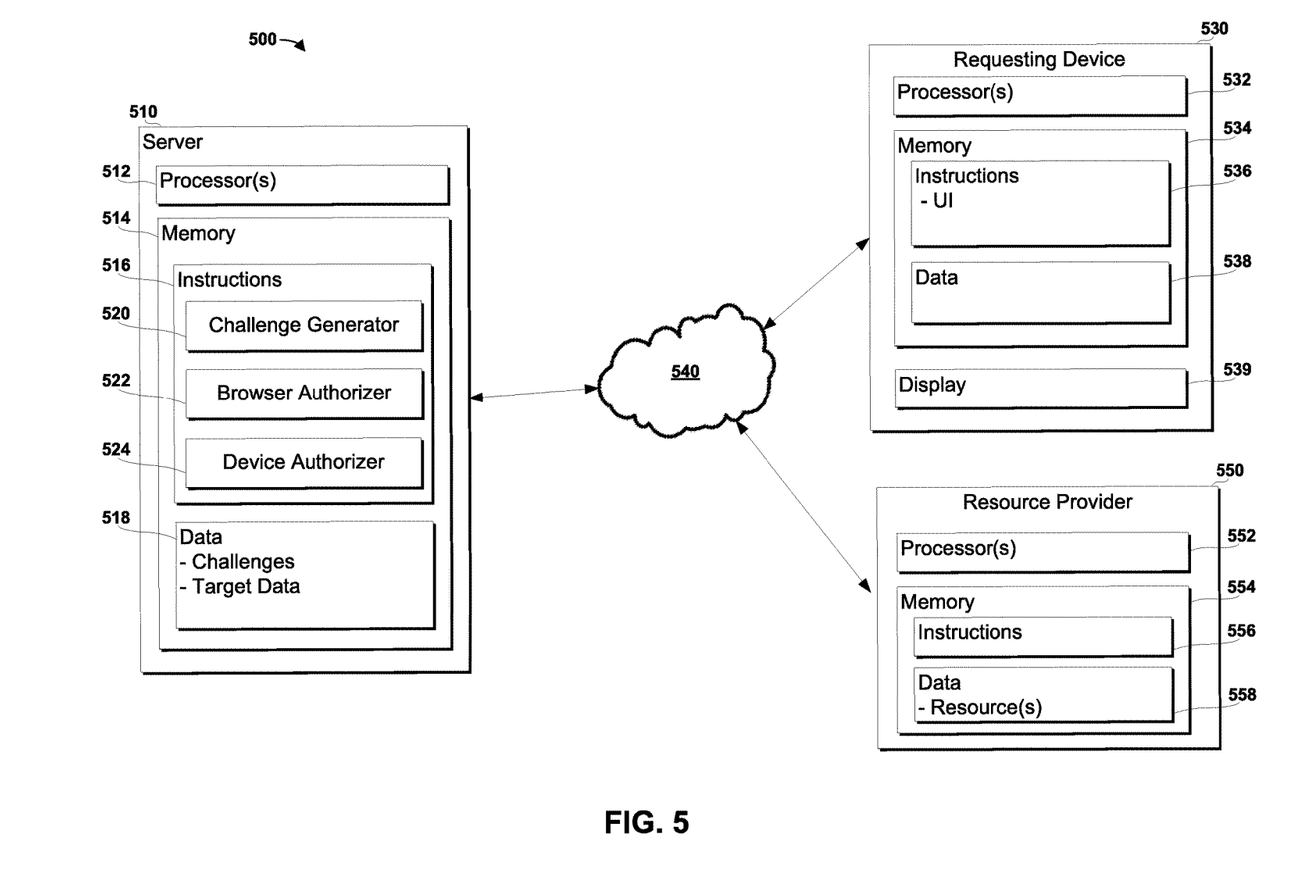
FIG. 5 depicts an example system according to example embodiments of the present disclosure.

FIG. 5 depicts an example computing system 500 that can be used to implement the methods and systems according to example aspects of the present disclosure. The system 500 can be implemented using a client-server architecture that includes a server 510 that communicates with one or more requesting devices 530 and/or resource provider 550 over a network 540. The system 500 can be implemented using other suitable architectures, such as a single computing device.

The system 500 includes a server 510, such as a web server. Server 510 can host a computerized verification system configured to grant or deny authorization to access online resources. Server 510 can be implemented using any suitable computing device(s). Server 510 can have one or more processors 512 and one or more memory devices 514. Server 510 can also include a network interface used to communicate with one or more requesting devices 530 and/or one or more resource provider 550 over the network 540. The network interface can include any suitable components for interfacing with one more networks, including for example, transmitters, receivers, ports, controllers, antennas, or other suitable components.

The one or more processors 512 can include any suitable processing device, such as a microprocessor, microcontroller, integrated circuit, logic device, or other suitable processing device. The one or more memory devices 514 can include one or more computer-readable media, including, but not limited to, non-transitory computer-readable media, RAM, ROM, hard drives, flash drives, or other memory devices. The one or more memory devices 514 can store information accessible by the one or more processors 512, including computer-readable instructions 516 that can be executed by the one or more processors 512. The instructions 516 can be any set of instructions that when executed by the one or more processors 512, cause the one or more processors 512 to perform operations.

The instructions 516 can be executed by the one or more processors 512 to implement, for instance, a challenge generator 520, a browser authorizer 522, and device authorizer 524. Challenge generator 520 can be configured to generate a challenge that includes a browser task. Browser authorizer 522 can be configured to receive responses to the challenges and to determine whether a request was sent from a browser and/or whether a browser of a requesting device is an authorized browser. Device authorizer 524 can be configured to determine whether to deny or grant a requesting device authorization to access a requested resource.

As shown in FIG. 5, the one or more memory devices 514 can also store data 518 that can be retrieved, manipulated, created, or stored by the one or more processors 512. The data 518 can include, for instance, target data, challenge data, and other data. The data 518 can be stored in one or more databases. The one or more databases can be connected to server 510 by a high bandwidth LAN or WAN, or can also be connected to server 510 through network 540. The one or more databases can be split up so that they are located in multiple locales.

Server 510 can exchange data with one or more requesting devices 530 and/or one or more resource provider 550 over the network 540. Although one requesting device 530 and one resource provider 550 are illustrated in FIG. 5, any number of requesting devices 530 and/or resource providers 550 can be connected to server 510 over the network 540. Each of the requesting devices 530 can be any suitable type of computing device, such as a general purpose computer, special purpose computer, laptop, desktop, mobile device, navigation system, smartphone, tablet, wearable computing device, a display with one or more processors, or other suitable computing device.

Similar to server 510, a requesting device 530 can include one or more processor(s) 532 and a memory 534. The one or more processor(s) 532 can include one or more central processing units (CPUs), graphics processing units (GPUs) dedicated to efficiently rendering images or performing other specialized calculations, and/or other processing devices. The memory 534 can include one or more computer-readable media and can store information accessible by the one or more processors 532, including instructions 536 that can be executed by the one or more processors 536 and data 538. For instance, the memory 534 can store instructions 536 for implementing a user interface in the event that requesting device 530 is a user device.

In the event the requesting device 530 of FIG. 5 is a user device, requesting device 530 can include various input/output devices for providing and receiving information from a user, such as a touch screen, touch pad, data entry keys, speakers, and/or a microphone suitable for voice recognition. For instance, requesting device 530 can have a display device 539 for presenting a user interface.

Requesting device 530 can also include a network interface used to communicate with one or more remote computing devices (e.g., server 510, resource provider 550) over the network 540. The network interface can include any suitable components for interfacing with one or more networks, including for example, transmitters, receivers, ports, controllers, antennas, or other suitable components.

Similar to server 510, a resource provider 550 can include one or more processor(s) 552 and a memory 554. The one or more processor(s) 552 can include one or more central processing units (CPUs), graphics processing units (GPUs) dedicated to efficiently rendering images or performing other specialized calculations, and/or other processing devices. The memory 554 can include one or more computer-readable media and can store information accessible by the one or more processors 552, including instructions that can be executed by the one or more processors 552 and data 558. For instance, the memory 556 can store instructions 556 for directing a requesting device to a verification system for a verification process. The data 558 can include, for instance, data associated with one or more resource. The data 558 can be stored in one or more databases. The one or more databases can be connected to resource provider 550 by a high bandwidth LAN or WAN, or can also be connected to resource provider 550 through network 540. The one or more databases can be split up so that they are located in multiple locales.

Resource provider 550 can also include a network interface used to communicate with one or more remote computing devices (e.g. server 550, requesting device 530) over network 540. The network interface can include any suitable components for interfacing with one more networks, including for example, transmitters, receivers, ports, controllers, antennas, or other suitable components.

Network 540 can be any type of communications network, such as a local area network (e.g. intranet), wide area network (e.g. Internet), cellular network, or some combination thereof. Network 540 can also include a direct connection between requesting device 530, server 510, and/or resource provider 550. In general, communication between server 510 and requesting device 530 can be carried via a network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method to screen for unauthorized devices, comprising:
   receiving, by a computing system that comprises one or more computing devices, a request from a requesting device to access a resource, wherein the requesting device is separate from the computing system;

generating, by the computing system, a challenge for the requesting device, wherein the challenge includes a first set of data, and wherein the challenge requires a browser of the requesting device to perform a browser task with respect to the first set of data to generate a second set of data based at least in part on a browser-type associated with the browser;

providing, by the computing system, the challenge to the requesting device;

receiving, by the computing system, a response to the challenge from the requesting device, wherein the response includes the second set of data generated by the browser of the requesting device through performance of the browser task with respect to the first set of data;

identifying, by the computing system, a browser-type of the browser of the requesting device based at least in part on the second set of data;

determining, by the computing system, whether the browser-type is an authorized browser-type; and determining, by the computing system, whether the requesting device is authorized to access the resource based at least in part on whether the browser-type of the requesting device is the authorized browser-type.

2. The computer implemented method of claim 1, wherein the browser task comprises execution of a set of JavaScript instructions, and the second set of data provides at least an indication of a Document Object Model of the browser of the requesting device or a hash of the indication of the Document Object Model of the browser of the requesting device.

3. The computer implemented method of claim 1, wherein the browser task comprises rendering of a Scalable Vector Graphics image, and the second data set comprises at least a portion of the rendered image or a hash of at least the portion of the rendered image.

4. The computer implemented method of claim 3, wherein determining, by the computing system, whether the browser-type is the authorized browser-type comprises comparing the rendered image to a target image.

5. The computer implemented method of claim 1, wherein the browser task comprises performing a hash function, and the second set of data comprises a hash value.

6. The computer-implemented method of claim 1, wherein the challenge is an invisible challenge.

7. The computer implemented method of claim 1, wherein the response does not include human input.

8. The computer implemented method of claim 1, wherein determining, by the computing system, whether the browser-type is the authorized browser-type comprises:
   comparing the second set of data to target data that includes one or more previous responses associated with one or more browser-types, and
   identifying the browser-type associated with the browser based at least in part on the comparison of the second set of data to the target data.

9. The computer-implemented method of claim 8, wherein the target data comprises crowd sourced data.

10. A computing system for screening unauthorized devices, comprising:
   one or more processors; and
   one or more memory devices, the one or more memory devices storing computer-readable instructions that when executed by the one or more processors cause the one or more processors to perform operations, the operations comprising:
      receiving a request from a requesting device to access a resource, wherein the requesting device is separate from the computing system;
      generating a challenge for the requesting device, wherein the challenge includes a first set of data, and wherein the challenge requires the requesting device to perform a verification task with respect to the first set of data to generate a second set of data;
      providing the challenge to the requesting device;
      receiving a response to the challenge from the requesting device, wherein the response includes the second set of data generated by the requesting device through performance of the verification task with respect to the first set of data;
      identifying a browser-type of the browser of the requesting device based at least in part on the second set of data;
      determining whether the browser-type is an authorized browser-type; and
      determining whether the requesting device is authorized to access the resource based at least in part on whether the browser-type is the authorized browser-type.

11. The computing system of claim 10, wherein determining whether the browser-type is the authorized browser-type comprises:
   comparing the second set of data to target data that includes one or more previous responses associated with one or more browser-types, and
   identifying the browser-type associated with the browser based at least in part on the comparison of the second set of data to the target data.

12. The computing system of claim 11, wherein the target data comprises crowd sourced data.

13. The computing system of claim 10, wherein the verification task comprises one or more of execution of a set of JavaScript instructions or rendering of a Scalable Vector Graphics image, and the second set of data comprises one or more of an indication of a Document Object Model of the browser of the requesting device, a hash of the indication of the Document Object Model of the browser of the requesting device, at least a portion of the rendered image, or a hash of at least the portion of the rendered image.

14. The computing system of claim 10, wherein the challenge is an invisible challenge.

15. The computing system of claim 10, wherein the response does not include human input.

16. One or more tangible, non-transitory computer-readable media storing computer-readable instructions that when executed by one or more processors cause the one or more processors to perform operations, the operations comprising:
   receiving a request from a requesting device to access a resource;
   generating a challenge for the requesting device, wherein the challenge requires a browser of the requesting device to perform a browser task without human input to generate a set of browser data based at least in part on a browser-type associated with the browser;
   providing the challenge to the requesting device;
   receiving a response to the challenge from the requesting device, wherein the response includes the set of browser data generated by the browser of the requesting device through performance of the browser task without human input;
   identifying the browser-type of the browser of the requesting device based at least in part on the set of browser data;

determining whether the browser-type is an authorized browser-type; and determining whether the requesting device is authorized to access the resource based at least in part on whether the browser-type is the authorized browser-type.

17. The one or more tangible, non-transitory computer-readable media of claim 16, wherein the browser task comprises execution of a set of JavaScript instructions, and the set of browser data provides at least an indication of a Document Object Model of the browser of the requesting device or a hash of the indication of the Document Object Model of the browser of the requesting device.

18. The one or more tangible, non-transitory computer-readable media of claim 16, wherein the browser task comprises rendering of a Scalable Vector Graphics image, and the second set of data comprises least a portion of the rendered image or a hash of at least the portion of the rendered image.

19. The one or more tangible, non-transitory computer-readable media of claim 16, wherein determining whether the browser-type is the authorized browser-type comprises:

comparing the set of browser data to target data that includes one or more previous responses associated with one or more target browser-types, and identifying the browser-type associated with the browser based at least in part on the comparison of the set of browser data to the target data.

* * * * *